United States Patent
Sawhney et al.

(10) Patent No.: US 9,330,645 B2
(45) Date of Patent: May 3, 2016

(54) MULTI-LEGGED STAND WITH STABILIZERS

(71) Applicants: Ravi Sawhney, Thousand Oaks, CA (US); Paul Janowski, Camarillo, CA (US); Kurt Botsai, Thousand Oaks, CA (US); Richard Firth, Valencia, CA (US)

(72) Inventors: Ravi Sawhney, Thousand Oaks, CA (US); Paul Janowski, Camarillo, CA (US); Kurt Botsai, Thousand Oaks, CA (US); Richard Firth, Valencia, CA (US)

(73) Assignee: RKS VENTURES LLC, Thousand Oaks, CA (US)

( * ) Notice: Subject to any disclaimer, the term of this patent is extended or adjusted under 35 U.S.C. 154(b) by 0 days.

(21) Appl. No.: 13/907,241

(22) Filed: May 31, 2013

(65) Prior Publication Data

US 2014/0151527 A1 Jun. 5, 2014

Related U.S. Application Data

(60) Provisional application No. 61/654,477, filed on Jun. 1, 2012.

(51) Int. Cl.
*G10G 5/00* (2006.01)
*F16M 11/24* (2006.01)
*F16M 11/28* (2006.01)
*F16M 11/04* (2006.01)

(52) U.S. Cl.
CPC ............... *G10G 5/00* (2013.01); *F16M 11/046* (2013.01); *F16M 11/242* (2013.01); *F16M 11/245* (2013.01); *F16M 11/247* (2013.01); *F16M 11/28* (2013.01)

(58) Field of Classification Search
CPC ....... G10G 5/00; F16M 11/041; F16M 11/22; F16M 11/24; F16M 11/242; F16M 11/245; F16M 11/247; F16M 11/28; F16M 11/38; F16M 2200/025; F16M 2200/027
USPC ........ 248/121, 122.1, 125.8, 163.1, 164, 431, 248/166, 434, 170, 188, 188.7, 443; 84/327, 329, 421
See application file for complete search history.

(56) References Cited

U.S. PATENT DOCUMENTS

| | | | | |
|---|---|---|---|---|
| 2,153,821 A * | 4/1939 | Walberg | ............ | 248/121 |
| 2,919,094 A * | 12/1959 | Petrick | ............ | 248/171 |
| 4,183,579 A * | 1/1980 | Gonzalez y. Rojas | ... | 297/195.11 |
| 4,759,660 A * | 7/1988 | Corbett | ............ | B63C 5/02 |
| | | | | 248/354.3 |
| 5,062,606 A * | 11/1991 | Hoshino | ............ | 248/171 |
| 5,165,635 A * | 11/1992 | Hoshino | ............ | 248/169 |
| 5,964,524 A * | 10/1999 | Qian | ............ | F16M 11/20 |
| | | | | 248/170 |
| 6,003,823 A * | 12/1999 | Hoffman | ............ | B63C 5/02 |
| | | | | 248/163.2 |
| 6,283,421 B1 * | 9/2001 | Eason et al. | ............ | 248/170 |
| 6,513,768 B1 * | 2/2003 | Hsieh | ............ | 248/121 |
| 6,723,907 B2 * | 4/2004 | Sato | ............ | 84/421 |
| 7,423,209 B2 * | 9/2008 | Chen | ............ | G10G 5/00 |
| | | | | 248/470 |
| 7,438,266 B2 * | 10/2008 | May | ............ | 248/163.1 |
| D594,253 S * | 6/2009 | Lippert | ............ | D6/312 |
| 7,718,878 B2 * | 5/2010 | May | ............ | F16M 11/32 |
| | | | | 84/422.1 |

(Continued)

*Primary Examiner* — Jonathan Liu
*Assistant Examiner* — Guang H Guan
(74) *Attorney, Agent, or Firm* — Risso & Associates

(57) ABSTRACT

Described is a multi-legged instrument stand that is specifically designed to increase stability and resistance to tipping. The stand can be used with any suitable instrument, such as guitars (via a guitar hanger), microphones, etc. The stand includes a base with a body pole. A leg connector is slidably attached with the body pole, with three legs and two stabilizers being pivotally connected with the leg connector. Thus, the legs and stabilizers can collapse for storage or rotate outward to allow the stand to be positioned upon a ground surface with increased stability.

13 Claims, 11 Drawing Sheets

(56) References Cited

U.S. PATENT DOCUMENTS

| | | | |
|---|---|---|---|
| D646,505 S * | 10/2011 | Eason | D6/682.3 |
| 8,319,662 B1 * | 11/2012 | Bontemps et al. | 340/908 |
| 8,367,919 B2 * | 2/2013 | Belitz | G10G 5/00 84/453 |
| 2008/0060498 A1 | 3/2008 | Samu | |
| 2008/0184866 A1 * | 8/2008 | Hsieh | F16M 11/16 84/327 |
| 2009/0139124 A1 * | 6/2009 | Cowgill | 40/610 |
| 2011/0107896 A1 * | 5/2011 | LeBlanc et al. | 84/327 |
| 2014/0151527 A1 * | 6/2014 | Sawhney | G10G 5/00 248/542 |

* cited by examiner

104

104

106

100

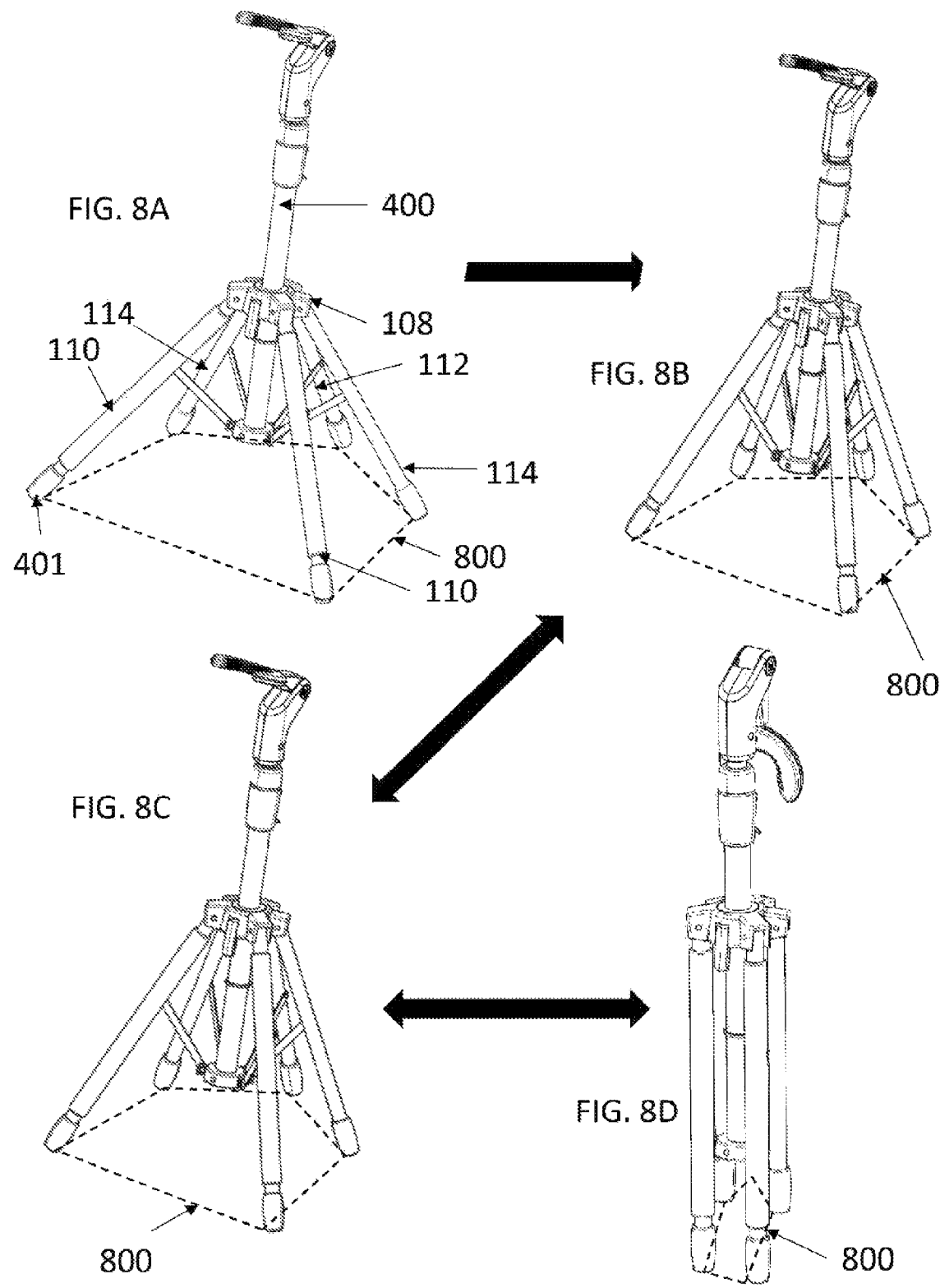

MULTI-LEGGED STAND WITH STABILIZERS

CROSS-REFERENCE TO RELATED APPLICATIONS

This is a non-provisional application of U.S. Provisional Application No. 61/654,477, filed on Jun. 1, 2012, entitled, "Five-Legged Stand."

BACKGROUND OF THE INVENTION (1) Field of Invention

The present invention relates to an instrument stand and, more particularly, to an instrument stand having multiple legs and stabilizers.

(2) Description of Related Art

Instruments stands have long been known in the art and are commonly used to hold and/or elevate a variety of instruments. For example, microphone stands are commonly used to hold a microphone at mouth level. As another example, guitar hangers are often used to hang a guitar by its neck for both storage and easy retrieval. Such a guitar hanger was disclosed in U.S. Patent Publication No 2008/0060498 (the '498 publication). The '498 publication discloses a traditional guitar hanger stand that includes a tri-pod like device with a pair of prongs for hanging the guitar. While functional for simple display and storage, the tri-pod style (as disclosed in the '498 publication) is not stable and could result in damage of the instrument if tipped over.

Thus, a continuing need exists for an improved instrument stand.

SUMMARY OF INVENTION

The present invention relates to an instrument stand and, more particularly, to an instrument stand that is specifically designed for stability to increase its resistance to tipping. For example, the instrument stand is multi-legged stand with stabilizers that are shaped and positioned to provide for increased stability.

In one aspect, the instrument stand includes a hanger assembly that is adapted to hold an instrument. A base assembly is attached with and provides a base for the hanger assembly. The base assembly includes a body pole with a leg connector slidably attached with the body pole. A plurality of legs and stabilizers are pivotally connected with the leg connector. The legs and stabilizers are pivotally connected with the leg connector to allow the legs and stabilizers to collapse in a first state around the body pole and pivot outward from the body pole to unfold in a second state.

In another aspect, the plurality of legs and stabilizers includes two front legs one rear leg, and two stabilizers, and wherein each of the legs and stabilizers have a length such that the front legs each have a length that is greater than a length of the stabilizers, and the stabilizers have a length that is greater than a length of the rear leg.

In another aspect an arm pivot is affixed with the body pole. Further, a plurality of center arms are included, each of which is pivotally attached between the arm pivot and a leg or stabilizer.

In yet another aspect, the number of legs and stabilizers is, collectively, six or more.

In another aspect, the leg connector is lockable to the body pole in an infinite range of positions to allow the leg spread infinite variability.

In yet another aspect, a fixed element is attached to the body pole to prevent the leg connector from traveling past a certain point.

In another aspect, the hanger assembly includes an instrument supporting element attached with an inner sliding rod, the inner sliding rod is adapted to fit slidably within the body pole, allowing a user to adjust a height of the instrument supporting element.

In yet another aspect, an adjuster assembly is attached to the body pole. The adjuster assembly is adapted to allow infinite adjustability of the inner sliding rod along its length with respect to the body pole, allowing the effective height of the instrument supporting element to be adjusted to accommodate longer instruments and shorter instruments.

In another aspect, each of the legs and stabilizers include leg ends that are covered with a soft end cap, thereby allowing the stand to be used on delicate surfaces without damage to said surfaces. The end caps are made of any material. In one aspect, the end caps are made of a material that glows in the dark, allowing musicians to see the position of the stand in a dark environment.

In yet another aspect, each leg has a center arm that is pivotally attached between the leg and an arm pivot, and each stabilizer has a center arm that is pivotally attached between the stabilizer and an arm pivot. Further, the center arms are attached with the legs and stabilizers such that the ends remain substantially in a common plane as they unfold.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8A is an illustration of the instrument stand, showing the legs and stabilizers in an expanded position;

FIG. 8B is an illustration of the instrument stand, showing the legs and stabilizers in an intermediate position;

FIG. 8C is an illustration of the instrument stand, showing the legs and stabilizers in an intermediate position; and FIG. 8D is an illustration of the instrument stand, showing the legs and stabilizers in a contracted position.

DETAILED DESCRIPTION

Figure 1:
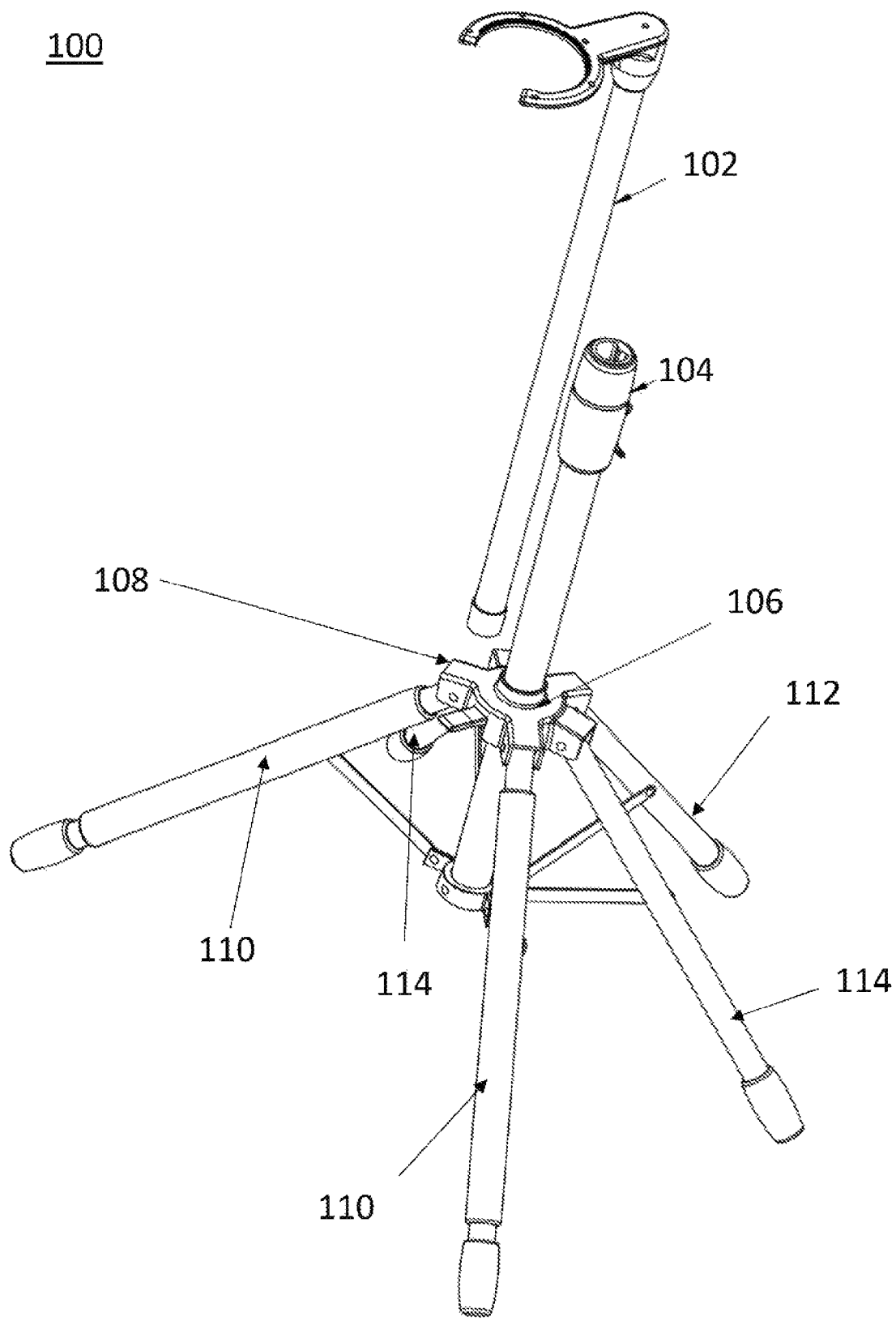
FIG. 1 is an illustration of an instrument stand according to the principles of the present invention, depicting a hanger assembly, an adjuster assembly, and a base assembly.

The present invention relates to an instrument stand and, more particularly, to an instrument stand having multiple legs and stabilizers. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

The present invention is directed to an instrument stand having multiple legs and stabilizers that are specifically designed to increase stability and resistance to tipping. The present invention is to be contrasted with the prior art, which typically includes three legs (in a tripod form). In the tripod form (of the prior art), each of the legs of the tripod always touch the ground surface. As such, a tripod is almost always the form by which a guitar hanger is implemented. However, as noted above, a tripod may be prone to tipping. If one was to implement additional legs on the mechanisms of the prior art, the additional legs would not all touch the ground surface simultaneously.

Thus, the present invention improves upon the prior art by providing, in one aspect, a stand with multiple legs and stabilizers of varying length such that all of the leg and stabilizer ends remain in a plane as they unfold. In other words, because all of the ends remain in a common plane, each of the multiple legs and stabilizers always touch the ground surface simultaneously, resulting in a stand that is very stable at any point of adjustment. Further, because the legs are of different legs, in operation, the stand may be allowed to tilt a little; however, the specific design of the present invention allows the stand to tilt up to a certain point (such as 30 degrees) without tipping over due to overbalancing which is a significant improvement over the prior art.

These aspects are described in further detail below and illustrated throughout the figures.

(2) Specific Aspects

As noted above and as illustrated in FIG. 1, the present invention is directed to an instrument stand 100 with multiple legs and stabilizers. The stand 100 can be used with any suitable instrument, non-limiting examples of which include guitars (via a guitar hanger), microphones, etc. As can be appreciated by one skilled in the art, there may be several mechanisms or techniques for implementing a multi-legged stand with stabilizers. Thus, the specific example described below and as illustrated in the figures is provided as one non-limiting example according to the principles of the present invention.

The stand 100 generally includes a hanger assembly 102, an adjuster assembly 104, and a base assembly 106. Notably, the base assembly 106 includes multiple legs and stabilizers that are pivotally attached to a leg connector 108. It should be noted that any suitable number of legs and stabilizers can be included according to the principles of the present invention. In this non-limiting example, the base assembly 106 includes two front long legs 110 and one rear short leg 112 pivotally attached to the leg connector 108. Additionally, two stabilizers 114 are pivotally attached with the leg connector 108. The leg connector 108 can be formed such that the stabilizers 114 are pivotally attached at any suitable location to allow them to unfold and align with the legs when contacting a ground surface. In this non-limiting example, legs 112 and 110 are pivotally connected with the leg connector 108 such that they are equidistance from one another. However, the stabilizers 114 are connected with the leg connector 108 such that each of the stabilizers 114 is positioned between a short leg 112 and a long leg 110. In other words and in this non-limiting example, the stabilizers 114 are not attached with the leg connector 108 between the two long legs 110.

Figure 2:
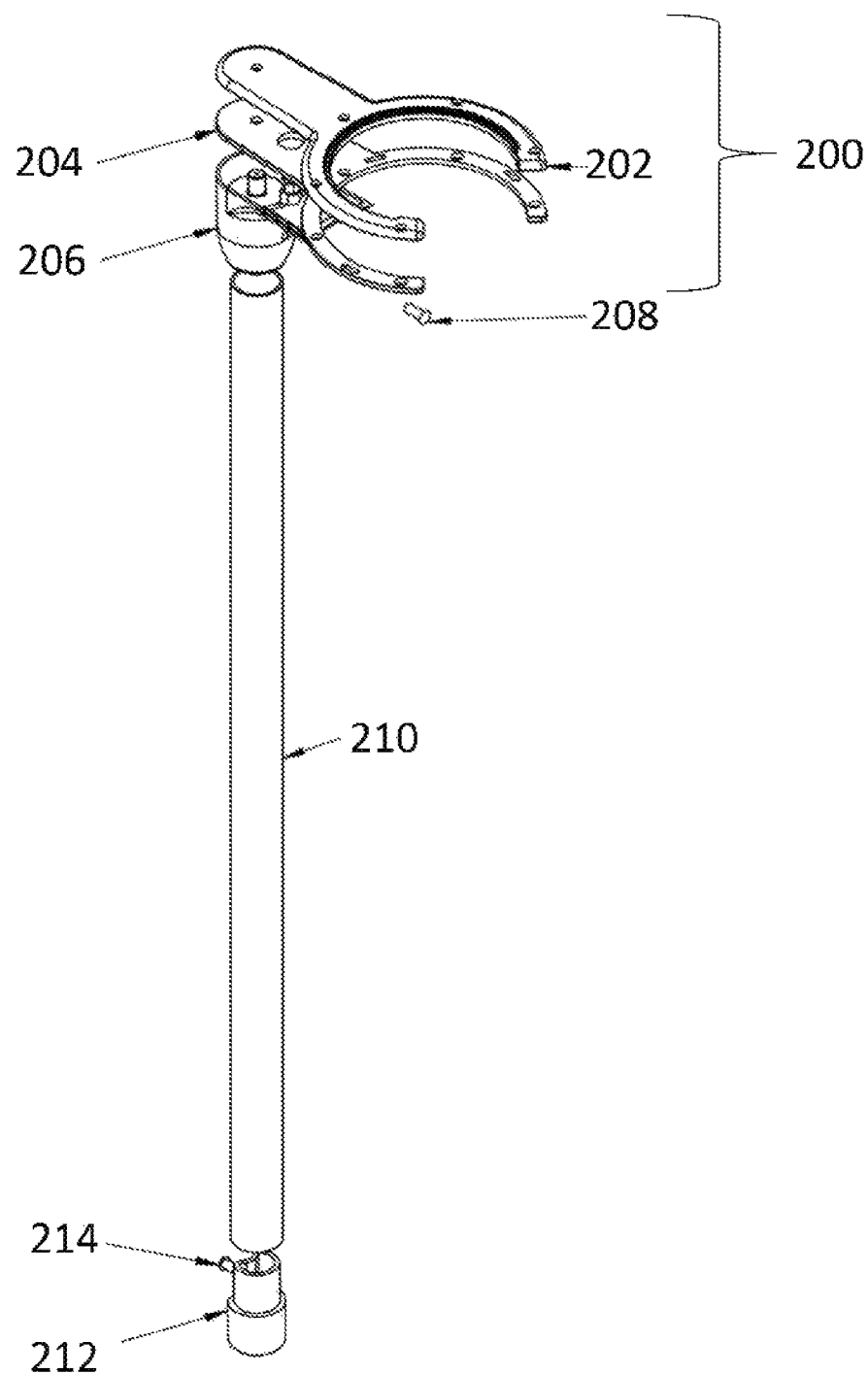
FIG. 2 is an illustration of the hanger assembly according to the principles of the present invention.

The hanger assembly 102 is depicted in FIG. 2. The hanger assembly 102 is any mechanism or device that allows a user to attach an instrument with the stand. As a non-limiting example, the hanger assembly 102 includes an instrument supporting element 200. The instrument supporting element 200 is any suitable mechanism or device that allows a user to support an instrument. As a non-limiting example, the instrument supporting element 200 includes a halo cover 202 (e.g., made of plastic), a halo plate 204 (e.g., made of metal), and a halo holder 206. The halo holder 206 is attachable with a rod and provides a base upon which the halo cover 202 affixes the halo plate 204 (using any suitable connection technique, mechanism or device (e.g., rivets 208, screws, etc.). It should be noted that although the term "halo" is used throughout this specification (which brings to mind a rounded form), the invention is not intended to be limited thereto. Instead, the term "halo" is meant to simply be an instrument connector (i.e., a device that can attach with or otherwise hold an instrument) in any desired form, non-limiting examples of which including being arcuate or rounded, being a hook shape, or being box-shaped, etc.

As noted above, the halo holder 206 is attached with a rod (or any suitable mechanism or device that provides for elevation). As a non-limiting example, the rod is an inner sliding rod 210 that as affixed with a sliding collar 212 (using any suitable connection technique, mechanism or device (e.g., rivet 214, screws, etc.). It should be noted the inner sliding rod 210 is not required but is intended to be an optional aspect. In other words, the hanger assembly 102 can be comprised of an instrument supporting element 200 that is attached directly to the body pole without any intermediate rod elements. In such an aspect, the hanger assembly 102 and instrument supporting element 200 could be used interchangeably.

Referring again to FIG. 1, it is noted that the hanger assembly 102 is attachable with the adjuster assembly 104 (such as the inner sliding rod being inserted therein) to allow a user to adjust the height of the hanger assembly 102 (and its instrument supporting element), thereby adjusting the height of any attached instrument. The adjuster assembly 104 is any suitable mechanism or device that allows a user to selectively adjust the height of the attached hanger assembly 102.

Figure 3A:
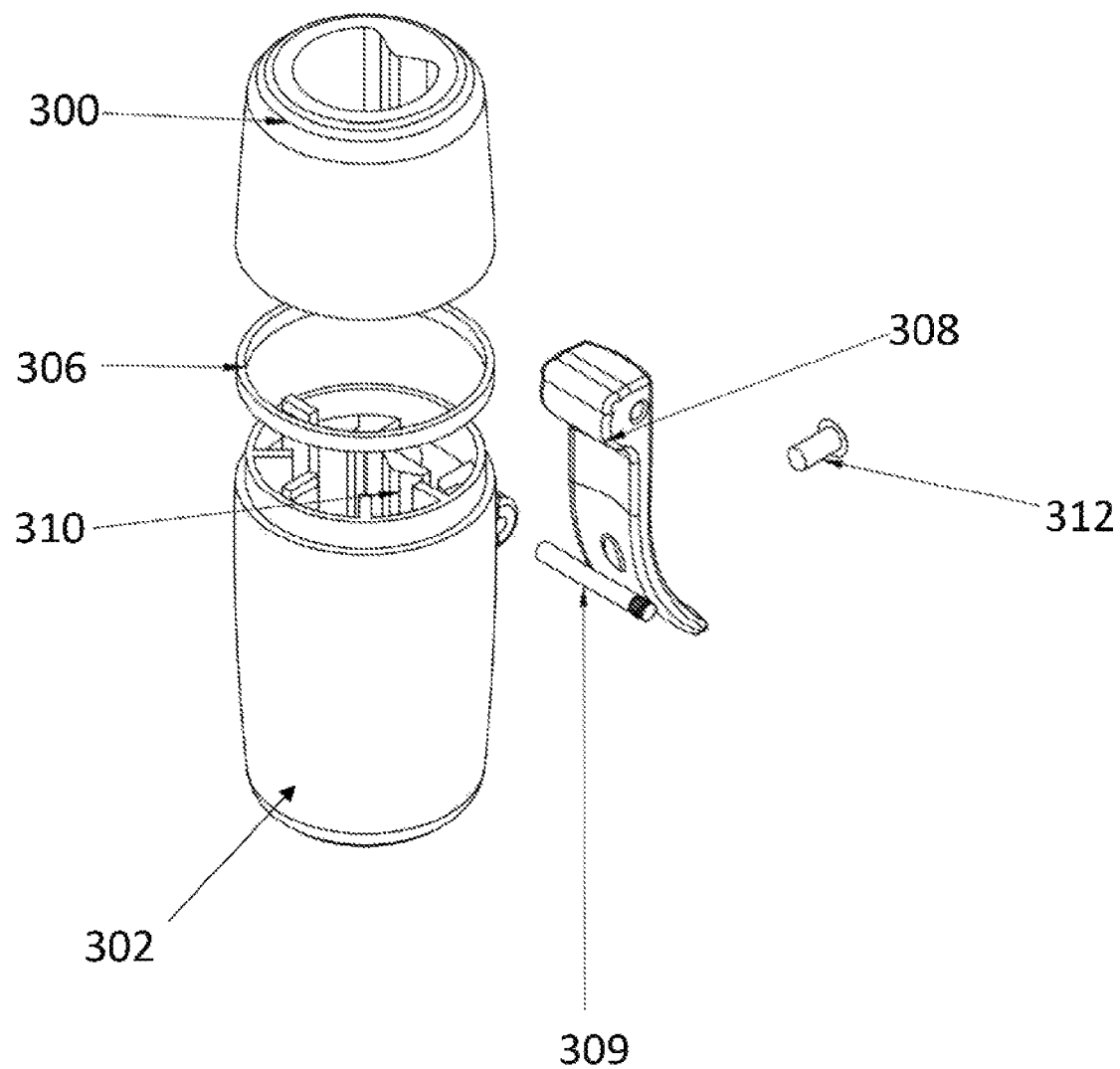
FIG. 3A is an illustration of the adjuster assembly according to the principles of the present invention.
Figure 3B:
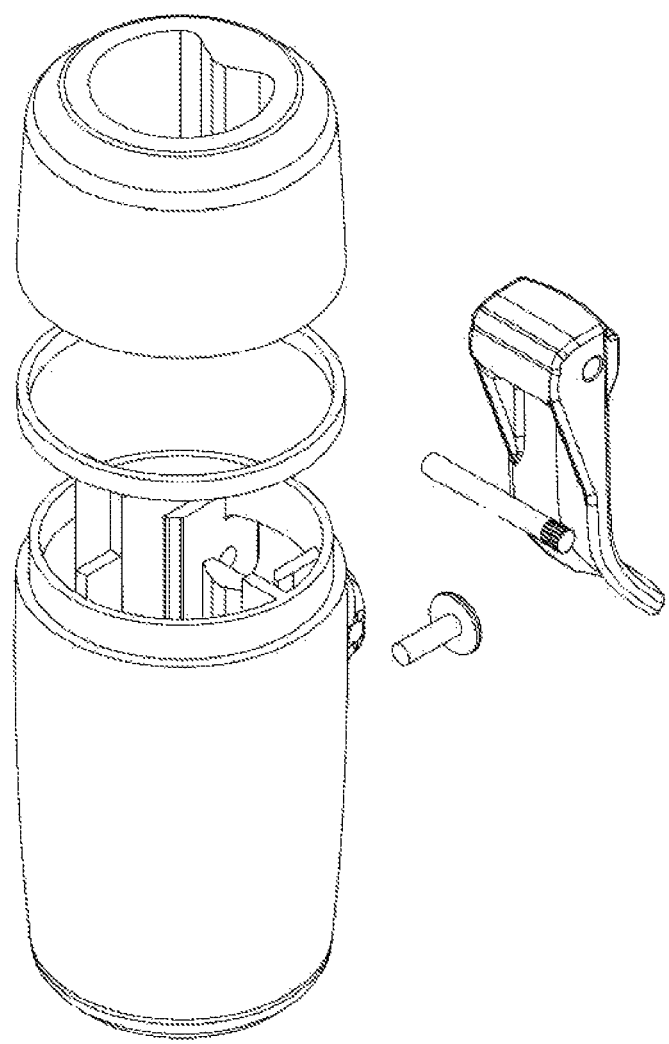
FIG. 3B is an illustration of the adjuster assembly according to the principles of the present invention.

As a non-limiting example and as depicted in FIG. 3A, the adjuster assembly 104 includes an adjuster top cap 300, an adjuster bottom cap 302, with a decorative ring 306 sandwiched therebetween. An adjuster toggle 308 is pivotally attached (with a locking pin 309 or any other suitable device) with the bottom cap 302. As can be understood by those skilled in the art, the adjuster toggle 308 allows a user to selectively affix an inner sliding rod that is slid through the adjuster assembly 104. For example, the adjuster toggle 308 can be swung out to release a pressure member 310 (that is within the bottom cap 302). Once released, the inner sliding rod (such as that depicted as element 210 in FIG. 2) can be slid up and down to the desired height. Thereafter, the user can press in the adjuster toggle 308, which causes the pressure member 310 to be forced against the sliding rod and affix the rod in place with respect to the adjuster assembly 104. It should be noted that a rivet 312 is also illustrated as a non-limiting example by which the adjuster assembly 104 can be affixed with the base assembly (e.g., by being riveted to the body pole). FIG. 3B provides another non-limiting example of an adjuster assembly 104. The adjuster assembly 104 of FIG. 3B is nearly identical to that of FIG. 3A, with the exception of some markings within the caps.

Figure 4A:
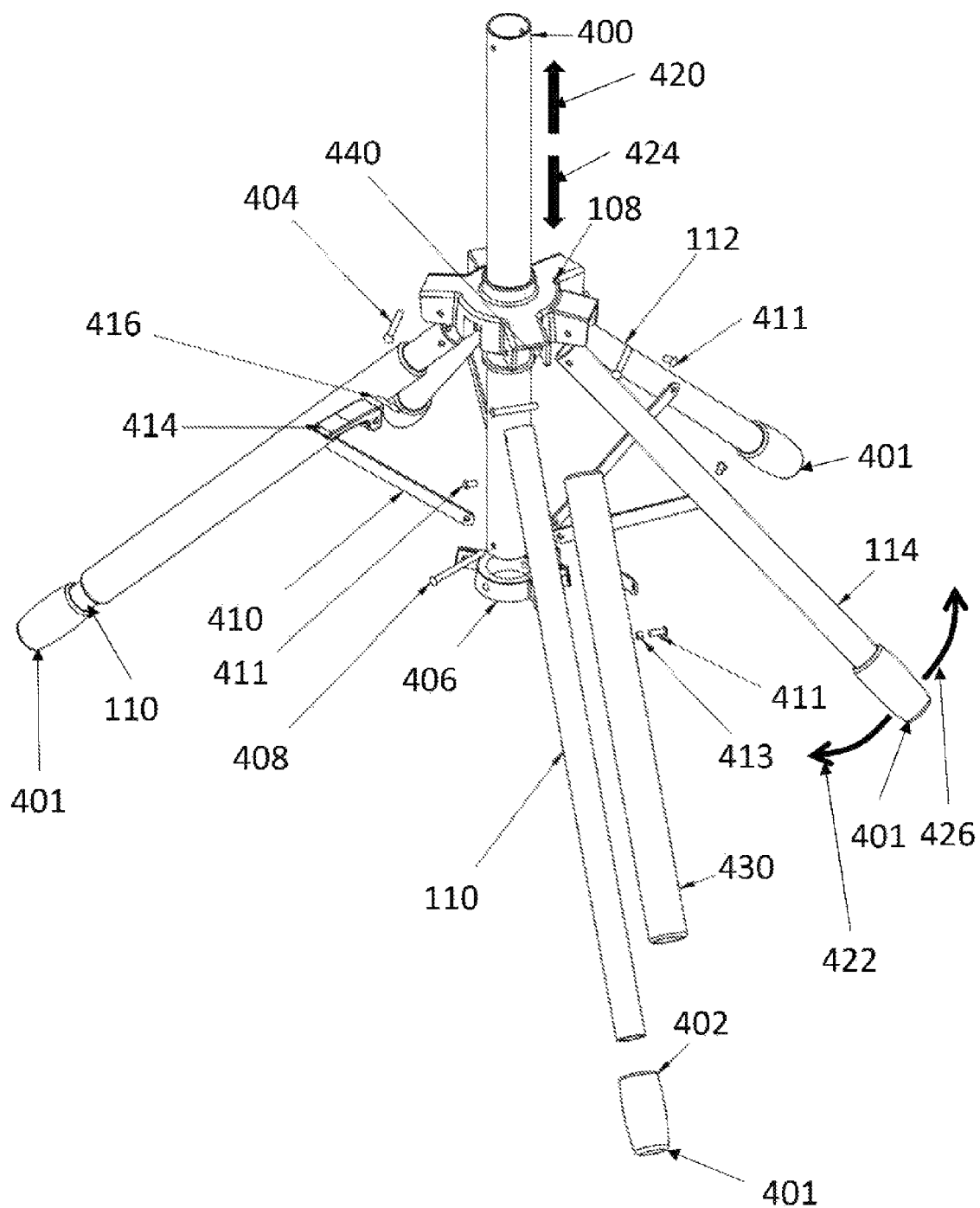
FIG. 4A is an illustration of the base assembly according to the principles of the present invention.

The base assembly 106 is further depicted in FIG. 4A. As noted above, the base assembly 106 is any suitable mechanism or device that includes multiple legs and stabilizers to increase the stability of the stand. While it is not required that all of the legs 110 and 112 and stabilizers 114 always touch the ground surface simultaneously, in a desired aspect, the legs 110 and 112 and stabilizers 114 are formed such that all of the lea and stabilizer ends remain in a plane as they unfold (as shown in FIGS. 8A through 8D), resulting in a stand that is very stable at any point of adjustment. More specifically, the legs 110 and 112 and stabilizers 114 are pivotally attached with the leg connector 108 such that they collapse in a first state and pivot outward to an expanded position in a second state. When pivoting outward, the ends of the legs 110 and 112 and stabilizers 114 remain in a common plane throughout at last a portion (if not all) of the pivot motion. A non-limiting example of a suitable mechanism that accomplishes such a motion and affect is provided below.

The base assembly 106 includes a body pole 400 that extends from and through the leg connector 102. In other words, the leg connector 108 is slidably attached with the body pole 400. Any suitable number of legs (e.g., three or more) and stabilizers (e.g., two or more) are pivotally connected with the leg connector 108 to allow the legs and stabilizers to collapse against the body pole 400 in a first state and pivot outward to an expanded position in a second state.

The legs 110 and 112 and stabilizers 114 can be formed to be any desired length and can all be the same or different lengths (or any combination thereof). For example, the stand can include two long legs 110, two medium stabilizers 114, and a rear, short leg 112, non-limiting examples of such lengths include 15.97 inches, 13.26 inches, and 12.23 inches, respectively. Although the legs 110 and 112 and stabilizers 114 are of different lengths, in the aspect depicted, they each include ends 401 that remain in a common plane as they unfold.

Thus, each of the legs 110 and 112 and stabilizers 114 include ends 401 that are formed to contact a ground surface. The ends 401 are provided at actual endpoints of the legs 110 and 112 and stabilizers 114 or, in another aspect, are distal points that are formed by soft elements (i.e., end caps) that allow the stand to be used on delicate surfaces without damage to said surfaces. Thus, in one non-limiting example, each of the legs 110 and 112 and stabilizers 114 include a rubber foot 402 (as an end cap) the forms the actual endpoint (i.e., end 401) of each of the respective legs 110 and 112 and stabilizers 114. The end caps or rubber feet 402 can be formed of any suitable material. In one aspect, the end caps or rubber feet 402 are made of a material that glows in the dark, allowing musicians to see the position of the stand in a dark environment Each of the legs 110 and 112 and stabilizers 114 are pivotally attached with the leg connector 108 using any suitable mechanism or device, a non-limiting example of which includes a rivet 404. Further, an arm pivot 406 is affixed with the body pole 400 using a rivet 408 or any other suitable technique, mechanism or device. Pivotally attached (using a rivets 411 or spacers 413 or any other suitable mechanism or device) between each leg 110 and 112 and the arm pivot 406 is a center arm 410. Similarly, pivotally attached (using a rivets 411 or spacers 413 or any other suitable mechanism or device) between each stabilizer 114 and the arm pivot 406 is a center arm 410. Thus, in the example depicted in FIG. 4A, the base assembly 106 includes five center arms 410, each of which is pivotally attached with the arm pivot 406 on one end and with a leg 110 and 112 or stabilizer 114 on the other end.

Figure 4B:
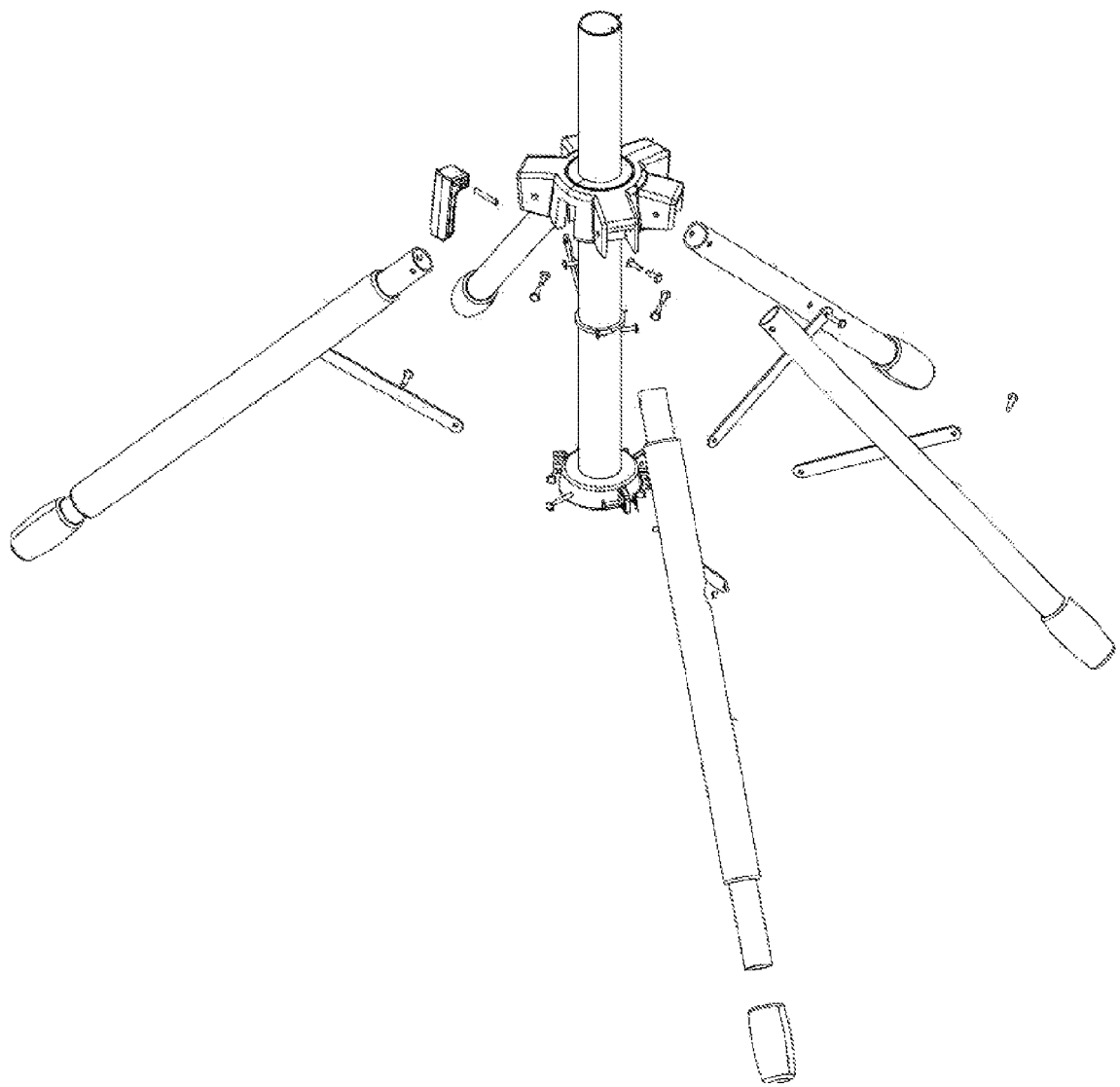
FIG. 4B is an illustration of the base assembly according to the principles of the present invention.

Additionally, a lock is included to selectively lock the slidable leg connector 108 in place with respect to the body pole 400. The lock is any suitable mechanism or device that is operable for affixing the leg connector 108 in place with respect to the body pole 400. As a non-limiting example, the lock includes a leg connector toggle 414 that is pivotally attached with the leg connector 108 using a locking pin 416. As was the case with the adjuster toggle referenced above, the leg connector toggle 414 can be swung out to release a pressure member (e.g., that is within the leg connector 108). Once released, the leg connector 108 can be slid up and down to the desired location. Thereafter, the user can press in the leg connector toggle 414, which causes the pressure member to be forced against the body pole 400 and affix the leg connector 108 in place with respect to the body pole 108. As can be appreciated by one skilled in the art, as the leg connector 108 is slid up 420 along the length of the body pole 400, the arms 110 and 112 and stabilizers 114 collapse inward 422 and around the body pole 400. Alternatively, as the leg connector 108 is slid down 424 the body pole 400, the arms 110 and 112 and stabilizers 114 pivot out 426 and away from the body pole 400 to provide a stable base for the stand. Although not required, a fixed element (such as a stop ring 440) can be attached to the body pole 400 to limit the down 424 motion of the leg connector 108 and thereby prevent the leg connector 108 from and traveling past a certain point (e.g., the location of the ring stop 440). In either event, when the legs 110 and 112 and stabilizers 114 are expanded outward (unfolded) in a leg and stabilizer spread, the stand can be positioned upon a ground surface with increased stability. Importantly and in a desired aspect, the leg connector 108 is lockable to the body pole 400 in an infinite range of positions to allow the leg spread (and stabilizer spread) infinite variability. For further understanding, FIG. 4B provides another illustration of a base assembly 106 according to the principles of the present invention.

As noted above and as depicted in FIG. 2, a hanger assembly 102 with an instrument supporting element 200 (e.g., guitar hanger) can be used to hang (support) a guitar by its neck. In doing so, the base or body of the guitar would inevitably rest upon the legs (e.g., long legs). To protect the body of the guitar and as depicted in FIG. 4A, a soft out sleeve 430 can be positioned around the desired leg (e.g., the long legs 110). The outer sleeve 430 is formed of any suitable material, a non-limiting example of which includes a foam sleeve or neoprene sleeve.

Figure 5A:
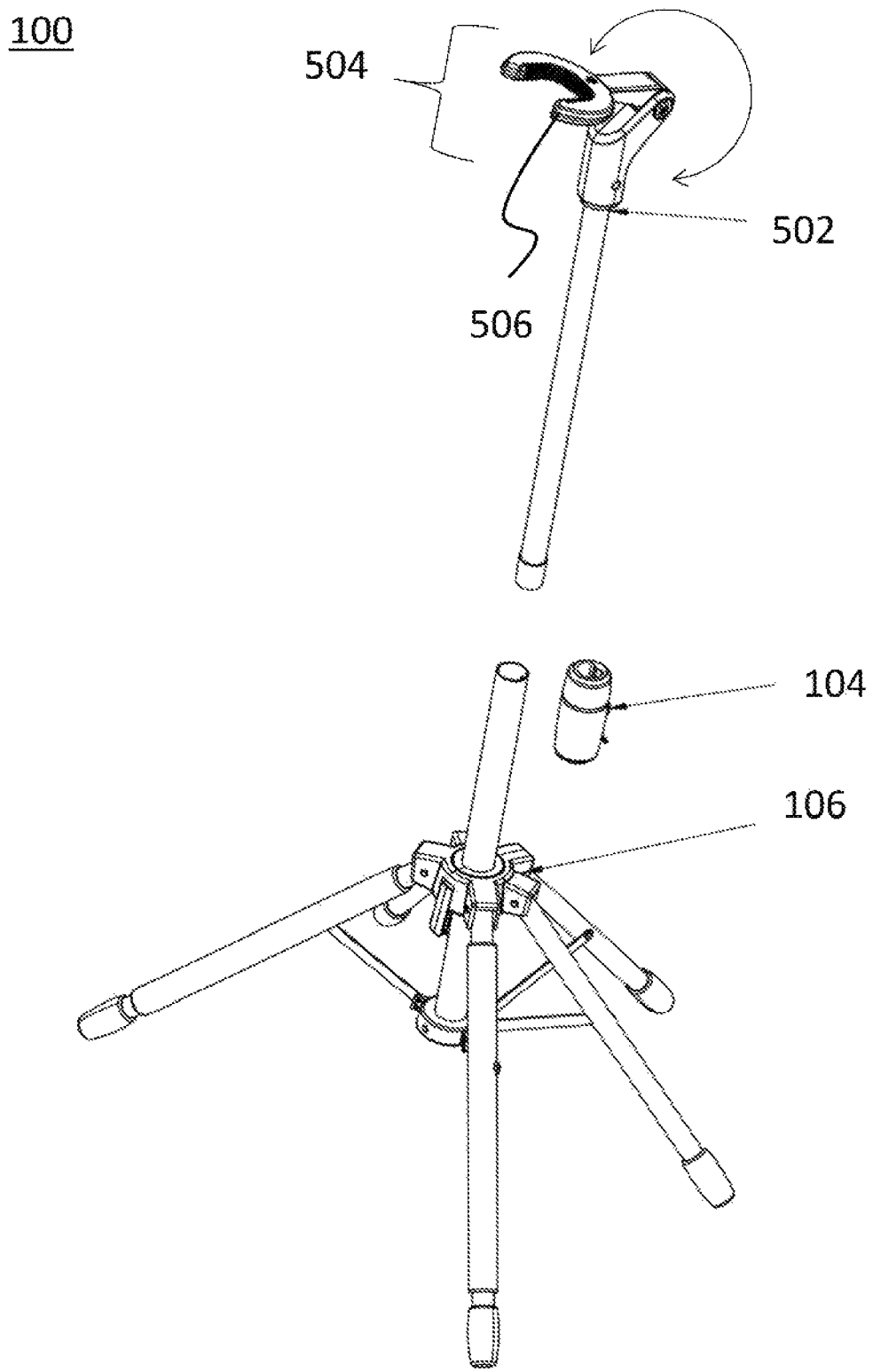
FIG. 5A is a front-view illustration of another aspect of a hanger assembly according to the principles of the present invention, depicting a rotatable instrument supporting element.
Figure 5B:
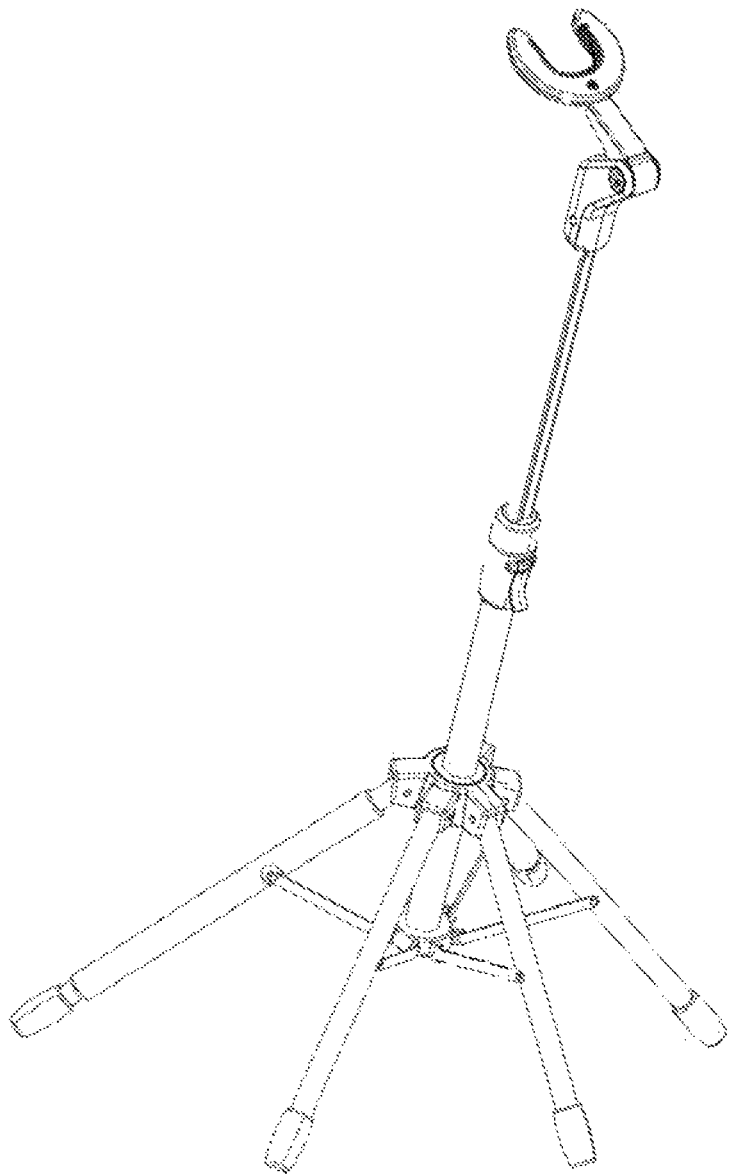
FIG. 5B is a rear-view illustration of the instrument stand.

Also as noted above, the hanger assembly 102 is any mechanism or device that allows a use to attach an instrument with the stand (one example of which is depicted in FIG. 2). Another non-limiting example of a suitable hanger assembly is depicted in FIG. 5A. Thus, as shown, the stand 100 includes the hangar assembly 502, an adjuster assembly 104 and a base assembly 106. To be contrasted with the example shown in FIG. 2, the hanger assembly 502 as shown in FIG. 5A includes an instrument supporting element 504 with a pivotable (rotatable) halo 506. In other words, the instrument supporting element 504 (with its halo 506 (or hanger)) can rotate from a stowed (folded position) to an extended (unfolded) position (as shown in FIG. 5A). Thus, in this aspect, the instrument supporting element 504 is rotatably attached to allow the instrument supporting element 504 to fold compactly against the body pole. This is further shown in the rear-view illustration of FIG. 5B.

Figure 6:
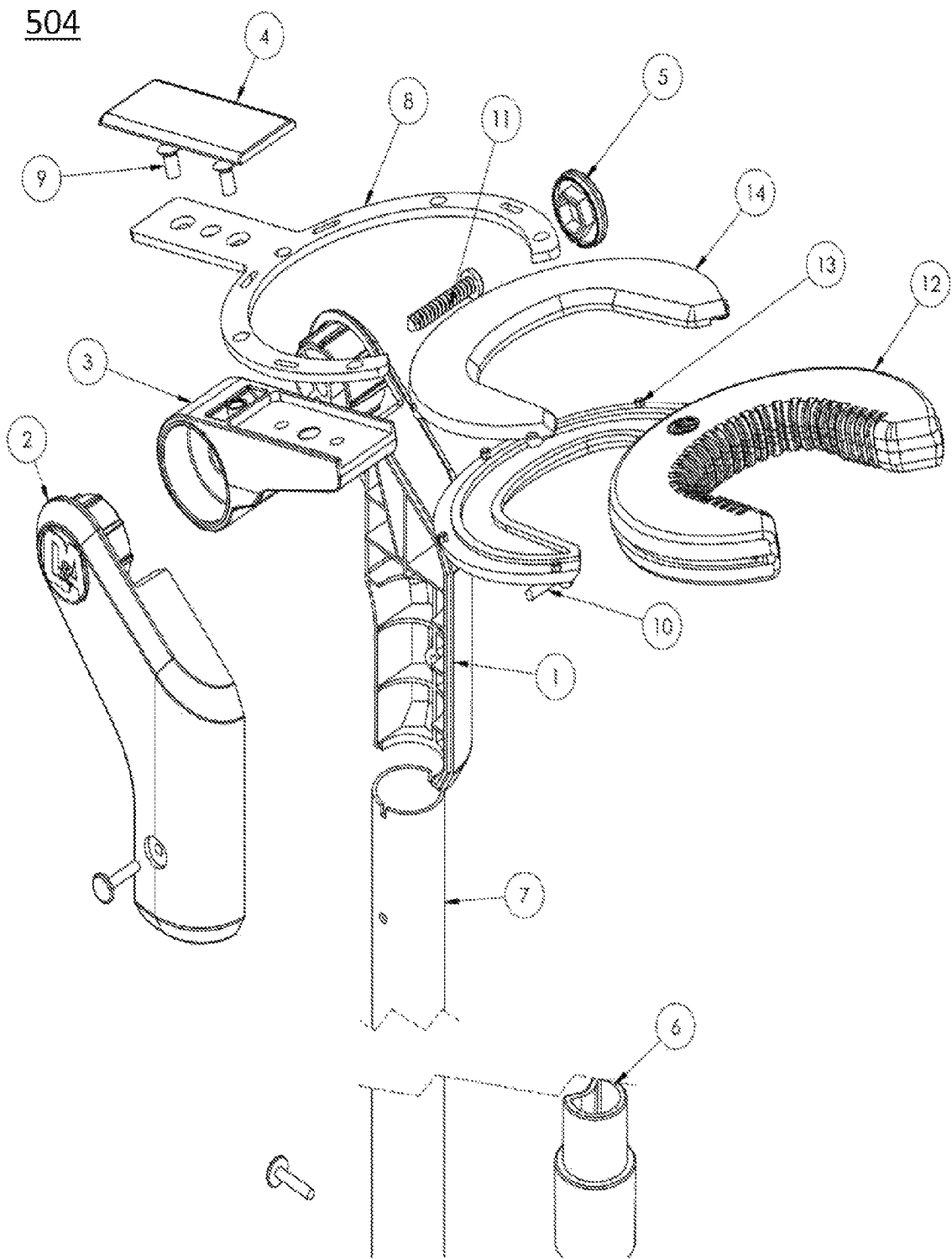
FIG. 6 is an exploded-view illustration of the instrument supporting element depicted in FIG. 5A.

For further understanding, FIG. 6 is an exploded-view illustration of the instrument supporting element 504 depicted in FIG. 5A. The instrument supporting element 504 is any suitable mechanism or device that allows a user to support an instrument and, in the aspect depicted in FIG. 5A, rotate between stowed and extended positions. A non-limiting example of such an instrument supporting element is depicted in FIG. 6.

In the example depicted in FIG. 6, the instrument supporting element 504 includes a right cover 1 attached (with a screw 11) to a left cover 2 for affixing (with rivets 10) the assembly with the inner sliding rod 7 (depicted as element 210 in FIG. 2). Also depicted is a rotating hanger 3, a rover plate 4, and a logo cap 5. The inner sliding rod 7 is attached with an inner sliding collar 6 (depicted as element 212 in FIG. 2) to allow the sliding rod 7 to be adjusted with respect to the base pole.

The hanger plate 8 is riveted to the rotating hanger 3 (with rivets 9). A gripping element 12 is attached with (e.g., overmolded) onto as hanger bottom 13, hanger top 14, and hanger plate 8. Thus, as can be appreciated by one skilled in the art, the instrument supporting element 504 is rotatably attached to allow the instrument supporting element 504 to fold compactly against the body pole in a stowed position and rotate out into an instrument supporting position.

Figure 7A:
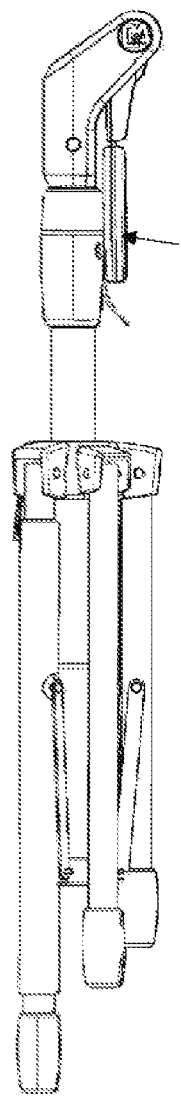
FIG. 7A is an illustration depicting the instrument stand and instrument supporting element in a stowed position.
Figure 7B:
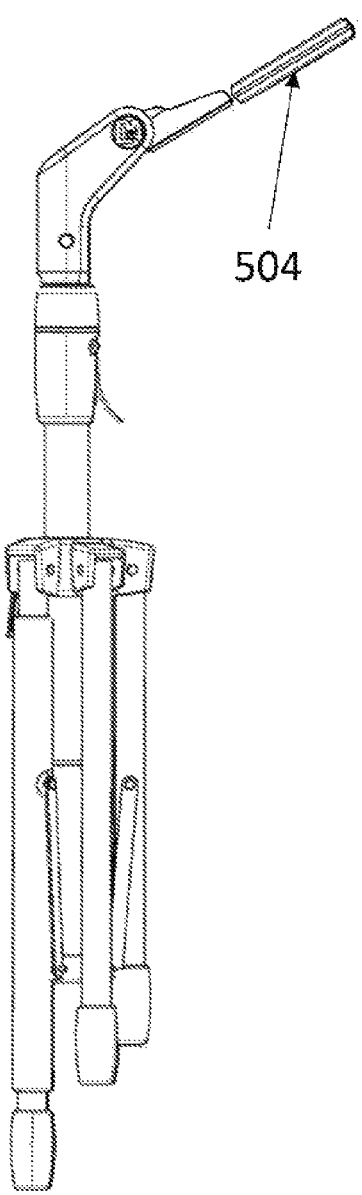
FIG. 7B is an illustration depicting the instrument stand and instrument supporting element in an intermediate position.
Figure 7C:
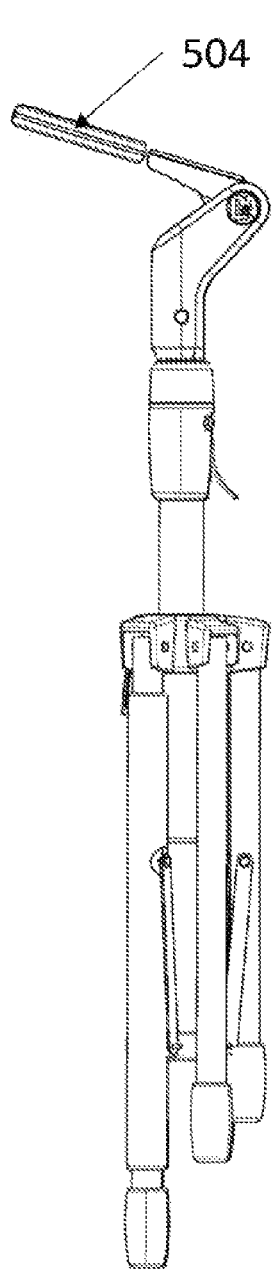
FIG. 7C is an illustration depicting the instrument stand and instrument supporting element in an instrument supporting position.

This is further depicted in FIGS. 7A through 7C. More specifically, FIG. 7A depicts the instrument stand 100 and instrument supporting element 504 in a stowed position, while FIG. 7B depicts the instrument supporting element 504 in an intermediate position, and FIG. 7C depicts the instrument supporting element rotated into an instrument supporting position.

As noted above and as depicted in FIGS. 8A through 8D, the leg connector 108 can be slid up and down the body pole 400 to cause the legs 110 and 112 and stabilizers 114 to expanded outward (unfolded) or contract inward into a stowed position. This motion of the legs 110 and 110 and stabilizers 114 is depicted through FIGS. 8A and 8D. Importantly and also as depicted, throughout the expansion and contraction, the ends 401 all share a common plane 800.

Thus, due to the multiple legs and stabilizers, the stand can effectively support a guitar or any other instrument with an increased resistance to tipping, thereby reducing the likelihood of damaging said instrument.

What is claimed is:

1. An instrument stand, comprising:
   a base assembly, the base assembly including:
      a body pole with a leg connector slidably attached with the body pole;
      at least two front legs, at least one rear leg, and at least two stabilizers, wherein the at least two front legs, the at least one rear leg, and the at least two stabilizers are each pivotally connected with the leg connector to allow the at least two front legs, the at least one rear leg, and the at least two stabilizers to collapse in a first state around the body pole and pivot outward from the body pole to unfold in a second state;
      wherein each of the at least two front legs, the at least one rear leg, and the at least two stabilizers has a fixed and nonadjustable length such that the length of each of the at least two stabilizers is less than the length of each of the at least two front legs but is greater than the length of the at least one rear leg;
      an arm pivot affixed with the body pole;
      a plurality of center arms, each center arm pivotally attached between the arm pivot and one of the at least two front legs, the at least one rear leg, and the at least two stabilizers;
      wherein each leg has a leg end and each stabilizer has a stabilizer end, with the center arms attached with the at least two front legs, the at least one rear leg, and the at least two stabilizers such that the leg ends and the stabilizer ends remain substantially in a common plane as the at least two front legs, the at least one rear leg, and the at least two stabilizers unfold, such that when the instrument stand is positioned upon a level horizontal surface, the leg ends and the stabilizer ends engage with the level horizontal surface and the body pole is tilted away from a vertical axis perpendicular to the level horizontal surface.

2. The instrument stand as set forth in claim 1, further comprising a hanger assembly attached with the base assembly, the hanger assembly being adapted to hold an instrument.

3. The instrument stand as set forth in claim 2, wherein the leg connector is lockable to the body pole in a plurality of positions to allow leg spread variability.

4. The instrument stand as set forth in claim 3, further comprising a fixed element attached to the body pole to prevent the leg connector from traveling past a certain point.

5. The instrument stand as set forth in claim 4, wherein the hanger assembly includes an instrument supporting element attached with an inner sliding rod, the inner sliding rod adapted to fit slidably within the body pole to allow a user to adjust a height of the instrument supporting element.

6. The instrument stand as set forth in claim 5, further comprising an adjuster assembly attached to the body pole.

7. The instrument stand as set forth in claim 6, wherein the adjuster assembly is adapted to allow adjustability of the inner sliding rod along a length of the inner sliding rod, allowing an effective height of the instrument, supporting element to be adjusted to accommodate longer instruments and shorter instruments.

8. The instrument stand as set forth in claim 7, wherein each of the leg ends and the stabilizer ends is covered with a soft end cap, thereby allowing the instrument stand to be used on delicate surfaces without damage to said delicate surfaces.

9. The instrument stand as set forth in claim 8, wherein the end caps are made of a material that glows in the dark to allow musicians to see a position of the instrument stand in a dark environment.

10. The instrument stand as set forth in claim 9, wherein the instrument supporting element is rotatably attached to allow the instrument supporting element to fold compactly against the body pole.

11. The instrument stand as set forth in claim 1, wherein the hanger assembly includes an instrument supporting element attached with an inner sliding rod, the inner sliding rod adapted to fit slidably within the body pole to allow a user to adjust a height of the instrument supporting element.

12. The instrument stand as set forth in claim 1, wherein each of the leg ends and the stabilizer ends is covered with a soft end cap, thereby allowing the instrument stand to be used on delicate surfaces without damage to said delicate surfaces, and wherein the end caps are made of a material that glows in the dark to allow musicians to see a position of the instrument stand in a dark environment.

13. The instrument stand as set forth in claim 1, further comprising an instrument supporting element that is rotatably attached to allow the instrument supporting element to fold compactly against the body pole.

\* \* \* \* \*